US007023826B2

(12) United States Patent
Sjöberg et al.

(10) Patent No.: US 7,023,826 B2
(45) Date of Patent: Apr. 4, 2006

(54) DEVICE FOR NARROW-BAND COMMUNICATION IN A MULTI-CARRIER SYSTEM

(75) Inventors: Sten Sjöberg, Landvetter (SE); Ulf Hansson, Lerum (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 900 days.

(21) Appl. No.: 09/883,294

(22) Filed: Jun. 19, 2001

(65) Prior Publication Data

US 2001/0053136 A1 Dec. 20, 2001

(30) Foreign Application Priority Data

Jun. 20, 2000 (SE) .................................... 0002332

(51) Int. Cl.
*H04Q 7/24* (2006.01)
(52) U.S. Cl. ..................................................... 370/338
(58) Field of Classification Search ........ 370/203–210, 370/464–470, 328–339
See application file for complete search history.

(56) References Cited

U.S. PATENT DOCUMENTS

| 5,764,699 | A | * | 6/1998 | Needham et al. ........... 375/261 |
| 6,122,263 | A | * | 9/2000 | Dahlin et al. ................ 370/329 |
| 6,175,550 | B1 | * | 1/2001 | van Nee ....................... 370/206 |
| 6,192,026 | B1 | * | 2/2001 | Pollack et al. ............... 370/203 |
| 6,349,217 | B1 | * | 2/2002 | Honcharenko et al. .. 455/562.1 |
| 6,463,096 | B1 | * | 10/2002 | Raleigh et al. .............. 375/225 |
| 6,480,476 | B1 | * | 11/2002 | Willars ......................... 370/311 |
| 6,490,257 | B1 | * | 12/2002 | Watanabe et al. ............ 370/318 |
| 6,535,739 | B1 | * | 3/2003 | Chen et al. .................. 455/437 |
| 6,754,195 | B1 | * | 6/2004 | Webster et al. .............. 370/335 |
| 6,781,980 | B1 | * | 8/2004 | Dajer et al. .................. 370/342 |
| 2001/0012276 | A1 | * | 8/2001 | Tsunehara et al. .......... 370/318 |
| 2005/0007977 | A1 | * | 1/2005 | Jou ............................. 370/328 |

OTHER PUBLICATIONS

Johnsson, HiperLAN/2—The Broadband Radio Transmission Technology Operating in the 5 GHZ Frequency Band, HiperLAN/2 Global Forum, pp. 1-22, 1999.*
JP 2000115834 a (Sony Corp), Apr. 21, 2000 (abstract), WoldPatents Index (online), London, UK: Derwent Publications, Ltd. (retrieved on Mar. 1, 2001). Retrieved from: EPO WPI Database DW200031, Accession No. 2000-357158.
JP 2000174725 A (Matsushita Denki Sangyo KK), Jun. 23, 2000 (abstract) World Patents Index (online), London, UK: Derwent Publications, Ltd. (retrieved on Mar. 1, 2001). Retrieved from: EPO WPI Database DW200041 Accession No. 2000-470675.
*IEICE Trans. Commun.*, vol. E82-B, No. 12, Dec. 1999, Incheol Jeong et al., "A Time Division Duplex CDMA System Using Asymmetric Modulation Scheme in Duplex Channel," pp. 1956-1963.

* cited by examiner

*Primary Examiner*—Frank Duong
(74) *Attorney, Agent, or Firm*—Nixon & Vanderhye P.C.

(57) ABSTRACT

A central unit for a multi-carrier system receives both multi-carrier and single carrier signals. The single carrier wave is a carrier wave that is part of the multi-carrier system for which the central unit is designed. The central unit schedules transmission from the single-carrier equipment in interaction with the single-carrier equipment.

25 Claims, 4 Drawing Sheets

DEVICE FOR NARROW-BAND COMMUNICATION IN A MULTI-CARRIER SYSTEM

TECHNICAL FIELD

This invention relates to a device which permits a narrow-band device, for example a hand-held computer, to communicate with a central unit in a multi-carrier system in an energy-efficient way.

BACKGROUND AND SUMMARY

Some modern digital telecommunication systems are multi-carrier systems where a number of carrier waves at different frequencies are used to transit information within the same time slot. A typical multi-carrier system comprises a central unit that handles the communication with and between a number of subscribers within a particular area. Such systems can also be used in, for example, office environments, in so-called LAN-systems (Local Area Network).

The multi-carrier technique demands a relatively high power supply for transmission because the amplifiers that are used in such systems have a low efficiency rating. Many types of equipment used for wireless communication in office environments, for example, portable computers and PDAs (Personal Digital Assistant) have power sources with extremely limited capacity, which means that it is difficult to use such equipment in multi-carrier systems. But it is still desirable to use, for example, portable computers and PDAs for wireless communication in systems where the multi-carrier technique is used.

The present invention makes it possible for equipment with a limited power supply to be incorporated in a multi-carrier system. A central unit for a multi-carrier system includes equipment for receiving a signal with multiple carrier waves, and equipment for receiving a signal with one carrier wave (single-carrier). The one carrier wave is one of the carrier waves is included in the multi-carrier system.

Because single carrier frequency transmission can be carried out in a more energy-efficient way than multi-carrier transmission, equipment that cannot communicate with the central unit in a multi-carrier system on account of limitations in its power supply can nonetheless transmit to the central unit transmission on a single frequency. The reception of multi-carrier signals does not require as much power as transmission, which means that equipment units with limited power can receive transmissions from the central unit in a multi-carrier system in the same way as other equipment units in the system. The fact that single-carrier units in the system transmit on one of the carrier waves that is already included in the multi-carrier system for which the central unit is designed means that the modifications that need to be made to a central unit to function according to the invention are small.

In addition to being provided with equipment for the reception of signals on a single carrier wave, the central unit may be equipped with a scheduler for scheduling transmissions from a single-carrier unit in interaction with this unit. The interaction with the single-carrier equipment for the scheduling of its transmissions may be carried out by modifying existing data frames used for scheduling communication within the multi-carrier system in which the central unit is incorporated. Single-carrier equipment is also provided that is equipped with means for scheduling its own transmissions to the central unit in interaction with a central unit in a multi-carrier system, preferably a central unit according to the invention.

DESCRIPTION OF THE FIGURES

In the following, the invention will be described in greater detail, utilizing examples of preferred embodiments and with reference to the attached figures, in which.

DETAILED DESCRIPTION

Figure 1:
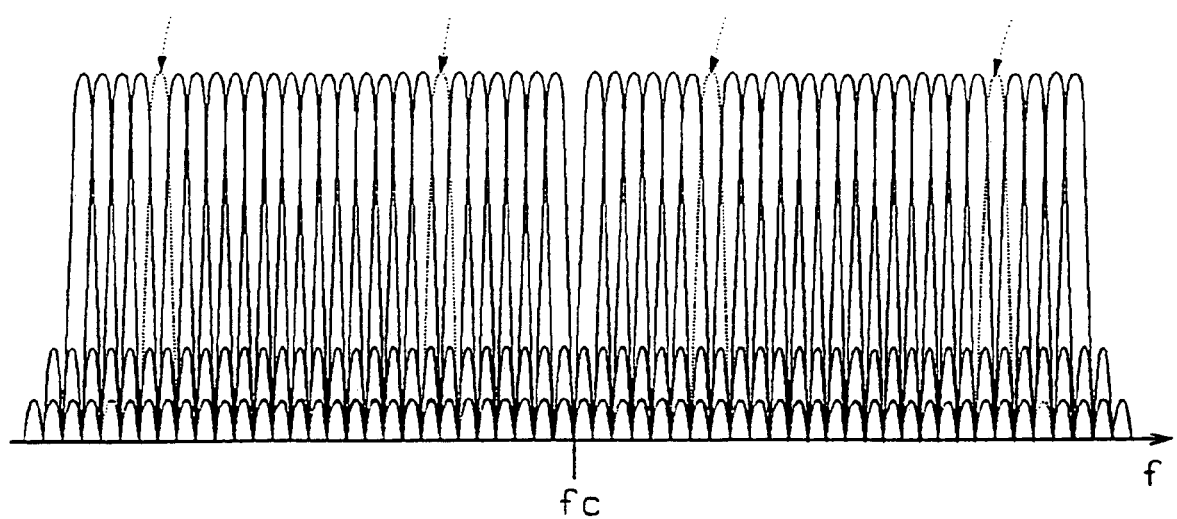
FIG. 1 shows the construction of different carrier-waves in a multi-carrier system.

The invention can be used in a large number of different types of system that use different types of multi-carrier modulation. But for purposes of illustration, the following description is in the non-limiting context of a Hiperlan/2 system which uses OFDM modulation, Orthogonal Frequency Division Multiplex. OFDM in Hiperlan/2 and IEEE 802.11a uses 48 different carrier waves for the transmission of data, as shown in FIG. 1. in addition to the 48 carrier waves for data transmission, the system uses four pilot tones, which are shown in FIG. 1 by broken lines and indicated with arrows. The pilot tones can, for example, be used for synchronization and measurement of signal strength. As also shown in FIG. 1, the 48 carrier waves are evenly distributed over the frequency spectrum, except at the central frequency where there is no carrier wave.

Within the Hiperlan/2 systems there are one or more central units, e.g., Access Points (AP), each of which handles the communication with and between a number of subscribers, mobile terminals (MT), within a particular area. The area's APs tell each MT when the MT can receive data from the AP and when it can transmit data to the AP. All communication in the Hiperlan/2 system is structured in time using MAC frames, Medium Access Control.

Figures 2, 3:
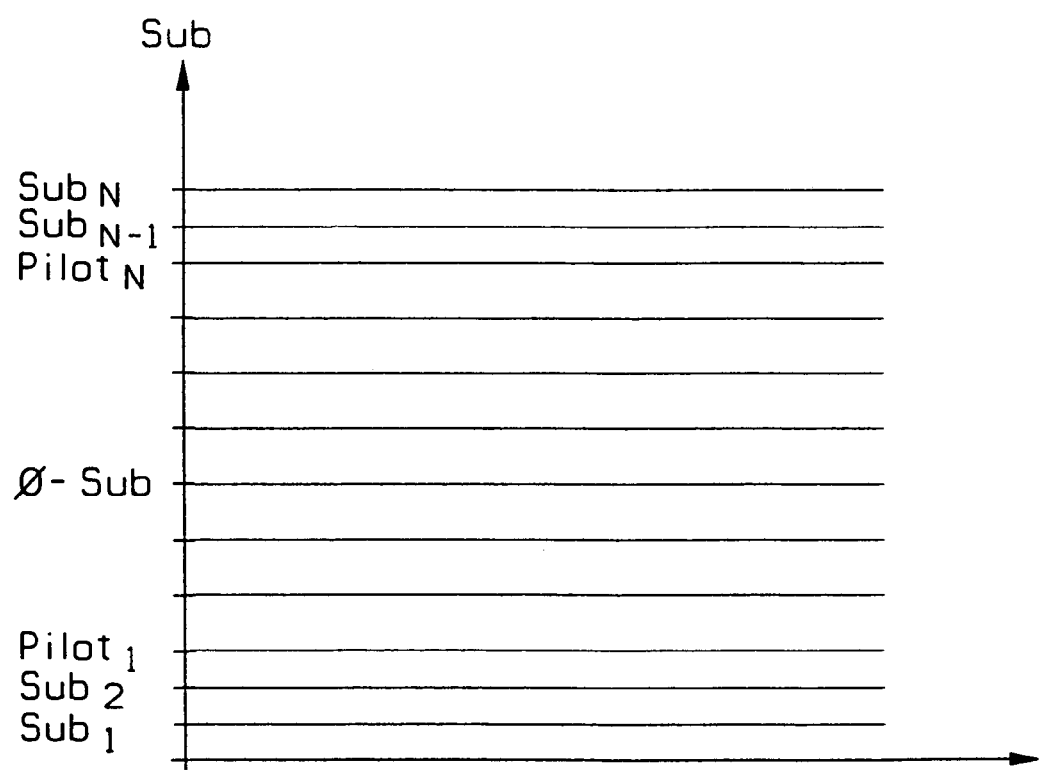
FIG. 2 shows a MAC frame in a multi-carrier system.
FIG. 3 shows communication over different carrier waves in a device according to one example.

FIG. 2 shows the basic construction of a MAC frame within the Hiperlan/2 system. When an MT wants to transmit data to AP, it is carried out in the following way:

1. MT sends a request to AP regarding being able to transmit data. This takes place in RACH, Random Access Channel.

2. AP sends out a signal that tells MT that its request regarding being able to transmit data has been received by AP. This is carried out in RFCH, Random Access Feedback Channel, in a later frame.

3. If the request is accepted by AP, AP tells MT when MT can transmit data to AP. This information concerning the allocated transmission slot is sent out in FCCH, Frame Control Channel, in another later frame.

4. MT transmits data to AP at the allocated time. This is carried out in DU, Data Uplink.

In addition to the parts described above, the MAC frame also comprises DD, Data Downlink, in other words data from AP to MT, and BCCH, Broadcast Control Channel.

FIG. 3 shows schematically one of the principles behind the invention. The system comprises a number, 1-N, of carrier waves. A number of these (in the Hiperlan/2 system four in number) are so-called pilot-tones, which are intended, for example, for synchronization of frequencies. In addition to the pilot tones, there is also a "gap", with no carrier wave, at the system's central frequency, the "zero frequency". As the central frequency in the system is not used, and the pilot tones are either unused or used to a minor extent, these frequencies may be used by one or more single-carrier units for transmission to the central unit in the system.

Figure 6:
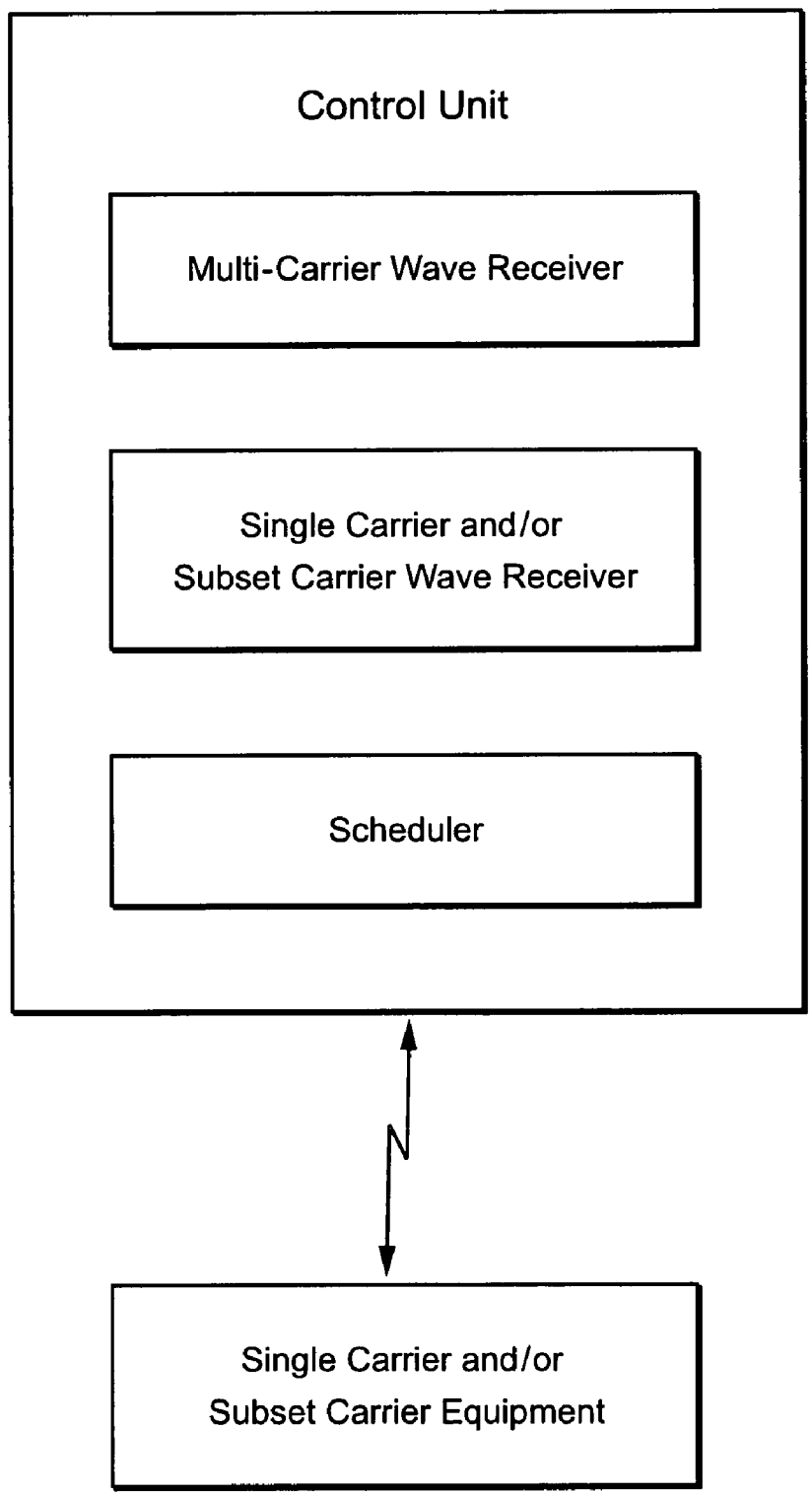
FIG. 6 shows a simplified function block diagram of an example central unit.

Both the central unit and the single-carrier unit(s) include a scheduler for scheduling the transmissions from the single-carrier unit to the central unit in interaction with each other. The central unit communicates with "ordinary" multi-carrier units in the multi-carrier system using the system's MAC frames and with the single-carrier units using modified MAC frames. Single-carrier units also communicate with the central unit using the modified MAC frames, as will also be described below. An example central unit is shown in FIG. 6 in simplified function block form communicating with single carrier and/or subset carrier equipment. It includes a multi-wave carrier receiver, a single-carrier wave and/or subset carrier wave receiver, and a scheduler.

Figure 4:
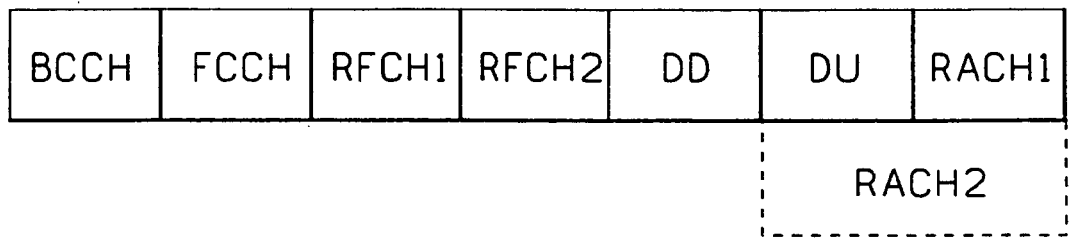
FIG. 4 shows a MAC frame in a system according to one example.

FIG. 4 shows an example of a modified MAC frame. The modification allows single-carrier MTs to send a request to transmit data, called RACH 2, where RACH 1 is the multi-carrier RACH described in connection with FIG. 2. In addition, the MAC frame permits an AP to indicate to a single-carrier MT that its request to transmit data (RACH 2) has been received by AP, which is carried out in RFCH 2, where RFCH 1 is the multi-carrier RFCH described in connection with FIG. 2.

The single-carrier units send their request regarding transmission (RACH 2) on the central frequency, the "zero carrier wave", but transmit their data on one of the pilot tones. This means that the single-carrier units can transmit to and receive from the AP at the same time as the "ordinary" multi-carrier units. In order for the single-carrier units to transmit data to the AP on the pilot tones, the multi-carrier units should avoid using the same pilot tones at the same time. This can be arranged in various ways, e.g., by changing the standard or by the AP scheduling transmission of the respective units. Preferably, not all single-carrier units send requests regarding transmission at the start of RACH 2. This can be achieved, for example, by any technique that spreads out the transmission requests in time, like "slotted ALOHA."

In order for the single-carrier units in the system to know when they can transmit their requests regarding transmission, they must know when RACH 2 commences in the relevant MAC frame. This information is suitably entered in each frame's FCCH, but can also be entered in the frame's BCCH. Each unit in the system has a "MAC-id", which the central unit in the system uses to identify information to and from the different units. If the information concerning the start time for RACH 2 is entered in FCCH, the information can suitably be entered as a separate MAC-id. This MAC-id does not correspond to any physical entity, but is a MAC-id that the single-carrier units listen for in order to obtain information from the central unit, for example concerning the start and stop times for RACH 2. Concerning the stop time for RACH 2, which coincides with the stop time for RACH 1, this can also be calculated by the single-carrier units based on the stall time of the current frame, as all the MAC frames have the same duration. As shown in FIG. 4, the start time for RACH 2 should coincide with the start time for DU, as this is the time when the central unit starts to listen for data from the units in the system.

Concerning the stop time for RACH 2, which coincides with the stop time for RACH 1, this can also be calculated by the single-carrier units, based on the start time of the current frame, as all the MAC frames have one and the same duration.

As mentioned above, there are different frequencies on which the single-carrier units can transmit data to the central unit. In FCCH for example, the central unit sends information to every single-carrier unit regarding which frequency that particular unit is to transmit data on at the time it has been granted permission to transmit, i.e., a "Resource Grant". The information regarding which transmission frequency a particular unit has been allocated can be sent out in a number of ways in FCCH, for example, by using unused bits in FCCH in order to discuss this explicitly with the units, or by the unit's MAC-id being taken modulo N, where N is a predetermined number, for example the number of free frequencies that are available for transmission, in which case N will be equal to the number four in the Hiperlan/2 system.

Figure 5:
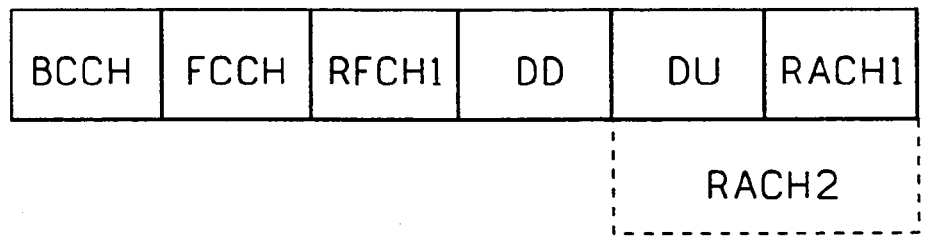
FIG. 5 shows a MAC frame in an alternative system according another example.

FIG. 5 shows an alternative MAC frame similar to the one described in connection with FIG. 4, but with RFCH 2 is not included. Corresponding information is sent instead to the single-carrier units in FCCH advising of the start time for RACH 2 and whether the request regarding transmission has been received by the AP. This information is sent using a special MAC-id that is known by the single-carrier units, which MAC-id is reserved for this information. All information about all narrow-band units' RA feedback is under one and the same MAC-id as a bitmap.

In order for the central unit to receive both multi-carrier signals and single-carrier signals at the same time, the central units is modified in comparison to traditional central units in multi-carrier systems. In one example of carrying out this modification, the central unit's existing receiver, (the part(s) that handle(s) the conversion of the signal), is not changed. However, a supplementary signal-processing function is introduced to separate the signals that arrive from the single-carrier units from the signals that arrive from the multi-carrier units. This supplementary signal-processing function can be implemented in a large number of ways familiar to experts in the field, and is not an essential part of the present invention, for which reason it is not described here in greater detail.

This invention is not limited to the embodiments described above but can be varied freely within the scope of the following patent claims. Examples of variants within the scope of the invention are that the narrow-band units do not transmit or receive on a single frequency. Transmission and/or reception can be carried out in principle via any subset of the frequencies that are available in the system.

The invention claimed is:
1. A central unit for a multi-carrier system, comprising:
multiple carrier wave reception equipment for the reception of a signal transmitted using multiple carrier waves from a multiple carrier unit;
subset carrier wave reception equipment for the reception of a signal transmitted on a subset of carrier waves from a subset-carrier unit equipped for transmitting a subset of the carrier waves in the multi-carrier system, where the subset of carrier waves corresponds to any subset of the carrier waves in the multi-carrier system; and
a scheduler for scheduling the signal transmission from the subset-carrier unit on the subset of carrier waves by communicating with the subset-carrier unit using a first transmission frame format modified from a second transmission frame format used for communications between the multiple carrier unit in the multi-carrier system and the central unit.

2. A central unit according to claim 1, wherein the first transmission frame format includes a data field for a subset-carrier unit to request permission to transmit data over the one carrier wave.

3. A central unit according to claim 1, wherein the first and second transmission frame formats are media access control (MAC) formats.

4. A central unit according to claim 3, wherein the scheduler is configured to use a MAC-identifier in scheduling transmissions with one or more subset-carrier units.

5. A central unit according to claim 1, wherein the subset of the carrier waves is one single carrier wave, and the subset-carrier unit is a single-carrier unit.

6. A central unit according to claim 5, wherein the one carrier wave corresponds to a carrier at a central frequency of the multi-carrier system or a pilot signal carrier of the multi-carrier system.

7. Subset-carrier equipment for transmitting a subset of the carrier waves in a multi-carrier system, equipped with means for receiving transmissions in the multi-carrier system; and means, in interaction with the central unit according to claim 1, for scheduling transmissions to the central unit, wherein the interaction with the central unit for the scheduling of transmissions is carried out by means of a modification of one of the existing frames used for scheduling the communication within the multi-carrier system.

8. Subset-carrier equipment according to claim 7, which is equipped with means for sending requests for data transmission to the central unit.

9. Subset-carrier equipment according to claim 7, wherein the subset of the carrier waves is one single carrier wave, and the subset-carrier equipment is single-carrier equipment.

10. Subset-carrier equipment, arranged for transmitting a subset of the carrier waves in a multi-carrier system, for use in a multi-carrier system including a central unit that communicates with multiple carrier units using multiple carriers, comprising:
a receiver for receiving a multi-carrier transmission from the central unit in the multi-carrier system;
a transmitter for transmitting a subset carrier transmission, using a subset of the carrier waves in the multi-carrier system where the subset of carrier waves corresponds to any subset of the carrier waves in the multi-carrier system, to the central unit; and
a scheduler for scheduling the subset carrier transmission to the central unit on a subset of the multiple carrier waves used in the multi-carrier system,
wherein the scheduler is configured to communicate with the central unit using a first transmission frame format modified from a second transmission frame format used for communications between a multiple carrier unit in the multi-carrier system and the central unit.

11. The subset-carrier equipment according to claim 10, wherein the first transmission frame format includes a data field for a subset-carrier unit to request permission from the central unit to transmit data over the subset of carrier waves.

12. The subset-carrier equipment according to claim 10, wherein the subset of the carrier waves is one single carrier wave, and the subset-carrier equipment is single-carrier equipment.

13. The single carrier equipment according to claim 12, wherein the one carrier wave corresponds to a carrier at a central frequency of the multi-carrier system or a pilot signal carrier of the multi-carrier system.

14. A method implemented in a central unit for a multi-carrier system, comprising:
receiving a signal transmitted using multiple carrier waves from a multiple carrier unit, and
receiving a signal transmitted on a subset of carrier waves from a subset-carrier unit equipped for transmitting a subset of the multiple carrier waves in the multi-carrier system, where the subset of carrier waves corresponds to any subset of the multiple carrier waves in the multi-carrier system; and
wherein the signal transmission from the subset-carrier unit on the subset of carrier waves uses a first transmission frame format modified from a second transmission frame format used for communications between the multiple carrier unit and the central unit.

15. A method according to claim 14, wherein the first transmission frame format includes a data field for a subset-carrier unit to request permission to transmit data over the one carrier wave.

16. A method according to claim 14, wherein the first and second transmission frame formats are media access control (MAC) formats.

17. A method according to claim 16, further comprising: using a MAC-identifier in scheduling transmissions with one or more subset-carrier units.

18. A method in claim 14, wherein the subset of the carrier waves is one single carrier wave, and the subset-carrier unit is a single-carrier unit.

19. A method according to claim 18, wherein the one carrier wave corresponds to a carrier at a central frequency of the multi-carrier system or a pilot signal carrier of the multi-carrier system.

20. A method according to claim 14, wherein the communicating step includes scheduling the transmission.

21. A method implemented in a subset-carrier equipment arranged for transmitting a subset of multiple carrier waves in a multi-carrier system including a central unit that communicates with multiple carrier units using multiple carriers, comprising:
receiving a multi-carrier transmission from the central unit in a multi-carrier system;
transmitting a subset carrier transmission, using a subset of the carrier waves in the multi-carrier system where the subset of carrier waves corresponds to any subset of the carrier waves in the multi-carrier system, to the central unit; and
communicating the signal transmission from the subset-carrier equipment, on the subset of the multiple carrier wave, using a first transmission frame format modified from a second transmission frame format used for communications between a multiple carrier unit in the multi-carrier system and the central unit.

22. The method according to claim 21 wherein the first transmission frame format includes a data field for a subset-carrier unit to request permission from the central unit to transmit data over the one carrier wave.

23. The method according to claim 21, wherein the subset of the carrier waves is one single carrier wave, and the subset-carrier equipment is single-carrier equipment.

24. The method according to claim 23, wherein the one carrier wave corresponds to a carrier at a central frequency of the multi-carrier system or a pilot signal carrier of the multi-carrier system.

25. A method according to claim 21, wherein the communicating step includes scheduling the transmission.

* * * * *